United States Patent
Lambricht et al.

(10) Patent No.: US 11,306,020 B2
(45) Date of Patent: Apr. 19, 2022

(54) GLASS SHEET WITH A HIGH LUMINOUS TRANSMITTANCE AND WITH WARM-TONED TO NEUTRAL COLORED EDGES

(71) Applicant: AGC GLASS EUROPE, Louvain-la-Neuve (BE)

(72) Inventors: Thomas Lambricht, Perwez (BE); Audrey Dogimont, Sart-Dames-Avelines (BE)

(73) Assignee: AGC GLASS EUROPE, Louvain-la-Neuve (BE)

(*) Notice: Subject to any disclaimer, the term of this patent is extended or adjusted under 35 U.S.C. 154(b) by 509 days.

(21) Appl. No.: 16/319,054

(22) PCT Filed: Jul. 18, 2017

(86) PCT No.: PCT/EP2017/068123
§ 371 (c)(1),
(2) Date: Jan. 18, 2019

(87) PCT Pub. No.: WO2018/015382
PCT Pub. Date: Jan. 25, 2018

(65) Prior Publication Data
US 2019/0359518 A1  Nov. 28, 2019

(30) Foreign Application Priority Data
Jul. 20, 2016 (EP) .................. 16180330

(51) Int. Cl.
*C03C 3/095* (2006.01)
*C03C 4/00* (2006.01)

(52) U.S. Cl.
CPC ............ *C03C 3/095* (2013.01); *C03C 4/0092* (2013.01); *C03C 2204/00* (2013.01)

(58) Field of Classification Search
CPC .............................. C03C 3/095; C03C 4/0092
See application file for complete search history.

(56) References Cited

U.S. PATENT DOCUMENTS

| 6,610,622 B1 | 8/2003 | Landa et al. | |
|---|---|---|---|
| 2003/0216241 A1 | 11/2003 | Landa et al. | |
| 2004/0180775 A1 | 9/2004 | Landa et al. | |
| 2004/0209757 A1 | 10/2004 | Landa et al. | |
| 2006/0115651 A1* | 6/2006 | Merfeld | C03C 3/095 428/410 |
| 2006/0270545 A1 | 11/2006 | Landa et al. | |
| 2008/0085827 A1* | 4/2008 | Thomsen | C03C 3/095 501/60 |
| 2014/0326314 A1* | 11/2014 | Dogimont | G02B 1/105 136/259 |
| 2019/0284088 A1* | 9/2019 | Lambright | C03C 3/095 |

FOREIGN PATENT DOCUMENTS

| WO | WO 03/064342 A1 | 8/2003 |
|---|---|---|
| WO | WO 2005/082799 A2 | 9/2005 |

OTHER PUBLICATIONS

International Search Report dated Oct. 12, 2017 in PECT/EP2017/068123 filed Jul. 18, 2017.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The invention relates to a glass sheet having a luminous transmission LTD4≥87% and having a composition free of antimony and arsenic, comprising total iron (expressed in the form of $Fe_2O_3$) from 0.002-0.04% and erbium (expressed in the form of $Er_2O_3$) from 0.003-0.1%. The glass sheet composition further having a redox ratio ≤32% and satisfying the formula $1.3*Fe_2O_3 \leq Er_2O_3 - 21.87*Cr_2O_3 - 53.12*Co \leq 2.6*Fe_2O_3$. Such a glass sheet has a high luminous transmittance and has warm-toned to neutral colored edges and is particularly suitable due to its aesthetics as building glass or interior glass, as well as in furniture applications, as automotive glass, or as cover glass in electronic devices/displays.

20 Claims, No Drawings

GLASS SHEET WITH A HIGH LUMINOUS TRANSMITTANCE AND WITH WARM-TONED TO NEUTRAL COLORED EDGES

1. Technical Field of the Invention

The present invention relates to a glass sheet having a high luminous transmittance and having edges with warm tone to neutral color. Due to its aesthetics, this invention is particularly suitable notably as building glass or interior glass, like for example in furniture applications, or as automotive glass, or also as cover glass in electronic devices/displays.

2. Description of the Prior Art

In the art, "ultra-white" or "extra-clear" glasses are known since years in the solar or building domain, due to their high luminous and/or energetical transmittance. These glasses contain low amount of iron and are thereby also often called "low-iron glasses".

Iron exists in the glass in the form of ferric ions $Fe^{3+}$ and ferrous ions $Fe^{2+}$. The presence of ferric ions gives to the glass a slight absorption of visible light of short wavelength and a higher absorption in the near ultraviolet (absorption band centered on 380 nm), while the presence of ferrous ions (sometimes expressed as FeO oxide) causes a strong absorption in the near infrared (absorption band centered on 1050 nm). Ferric ions provide a light yellow coloration while ferrous ions give a pronounced blue-green color. Thus, the increase of the total iron content (both forms) enhances the absorption in the visible, to the detriment of light transmission.

Low-iron glasses comprise typically total iron in an amount less than 0.04 wt % or even less than 0.02 wt % (expressed as $Fe_2O_3$) and are generally considered as substantially colorless. Nevertheless, it is a known that, even if such glasses in the form of a sheets can be qualified as colorless when looking through their main faces, their edges appear to be significantly colored (because of the elongated view path). When considering classical low-iron solar glass sheets, like for example Sunmax® glass from the Company AGC Glass Europe, one can observe, irrespective of the sheet thickness, a greenish-yellowish tint of the glass edges.

Even if colored glass edges are acceptable for many applications (like for solar applications for example), there may be aesthetic issues with a green/yellow edge tint for other applications, particularly if:
  the edge color has to be compatible with the decor of the room or with the other portions of the furniture of which the glass is a part; or
  if the glass is arranged directly adjacent to objects of different colors, for example in articles of furniture; or
  when the glass sheets, such as for example table tops or some smartphones, are arranged such that their edges are in the direct field of view of an observer.

To solve these aesthetical issues, one known solution to avoid the coloration of the edges of extra-clear glass is to further decrease the total iron content in the composition. However, this solution increases drastically the resulting glass cost because a very low iron content requires expensive, very pure raw materials and/or also their purification. Moreover, it is limited to a minimum level of iron for processing reasons (furnace wear highly accelerated, quality issues, yield loss, higher consumption during low-iron production).

Next to that, it has been also proposed to avoid the undesired green/yellow tint of the edges of classical extra-clear glass sheets by producing a more pleasing color (for example a blue tint) that dominates over the initial green/yellow color.

To give edges with a desirable/pleasing color in low-iron glass sheets, several solutions have been described:
  EP0463607 B1 suggests, in addition to minimizing the iron content in the glass to less than 0.02 weight % $Fe_2O_3$ (total iron content), that the redox ratio should be increased (that-is-to-say increase the amount of ferrous ions $Fe^{2+}$) and, in particular, adjusted it to at least 0.44. Unfortunately, such a solution gives only access to glass sheets with cold-toned edges (bluish-greenish tint).
  U.S. Pat. No. 6,218,323B1 also proposes to give a blue tint to edges of a glass sheet by incorporating cobalt in the range 0.1-1 ppm (as CoO) in a soda-lime-silicate glass with total iron below 0.03 wt % (as $Fe_2O_3$). Such a solution has however some drawbacks: when industrially manufacturing a glass sheet containing from 0.1 to 1 ppm of CoO, the following problem is likely to result: it is not straightforward to uniformly mix and disperse so very small amount of cobalt raw materials in the glass batch/melt so that fluctuation of the cobalt content in the glass tends to be substantial. Moreover, such disclosed compositions gives only access to glass sheets with cold-toned edges (blue tint).
  Another solution (described in WO2005082799A2) to obtain a pleasing tint to edges of a glass sheet with high luminous transmittance resides in the use of significant amount of cerium oxide (examples have from 0.035 to 0.1 wt % $CeO_2$) acting as a glass "decolorizer" through oxidizing colorant ferrous species. This was however not considered as sufficient to give to the edges of a glass sheet the desired color. Therefore, in order to compensate for the resulting undesired color caused by the ferric species formed by adding $CeO_2$ to the glass, erbium oxide (examples have from 0.06 to 0.1 wt %) was added. However, such a solution does not give access to glass sheets with warm-toned edges. Moreover, due to presence of significant amounts of cerium, resulting glass sheets are highly subjected to the phenomenon known as "solarization" in which the luminous transmission of the glass decreases over time due to exposure to ultraviolet radiation present in sunlight. Finally, such high amounts of cerium and erbium, which are quite expensive materials, result in a significant additional cost of the glass.
  US2015/0045202A1 discloses glass sheets with high luminous transmittance and with a composition comprising notably low iron content (from 0.012 to 0.018 wt %), $Er_2O_3$ (from 0.04 to 0.05 wt %) and $SnO_2$ as reducing agent (from 0.035 to 0.09 wt %). Unfortunately, such disclosed compositions gives only access to glass sheets with cold-toned edges (neutral to slightly bluish-tint) and lower luminous transmittance linked to their higher redox ratio induced by presence of significant amounts of reducing $SnO_2$.

Hence, the major part of solutions identified in the state-of-the-art to render more pleasing the natural greenish-yellowish tint of the edges of a low-iron glass sheet allows to get cold-toned edges and, in particular, blue-colored edges.

Tough, glass sheets with high visible luminous transmittance coupled with aesthetically pleasing warm-toned edges (to match/harmonize with surrounding wood furniture, for example) is still needed in the glass market. In this context, EP0463606 B1 teaches, with low iron content of less than 0.02 weight % $Fe_2O_3$ (total iron content), that selenium can be added in very low amounts (0.3-2 ppm) in order to obtain glass sheets with wood- or honey-toned edges. Cobalt can optionally be added, if desired, in an amount up to 3 ppm (CoO) to render edges more neutral, approaching grey color. Unfortunately, such low amounts of selenium, which is known as a very volatile compound during glass manufacturing, gives serious issues of retention yield stability and thereby color stability of the final glass production.

The "warm tone" in present text means a color which is defined by positive coordinates in a*b* system or, in other words, a color which lies in the first dial of the a*b* diagram. A warm tone in present invention includes, for example, a wood tone, a honey tone and also an almost neutral tone close to 0; 0 coordinate in the a*b* diagram but in the first dial. As a comparison, classical low-iron solar glass sheets from the state-of-the-art, like for example Sunmax® glass from AGC Glass Europe, has a negative a* value and a positive b* value (then positioning in the fourth dial in the a*b* diagram).

3. OBJECTIVES OF THE INVENTION

The present invention has notably the objective of overcoming the cited drawbacks of the prior art.

More precisely, one objective of the invention is to provide a glass sheet having a high luminous transmittance and having edges which are warm-toned to neutral/colorless.

Another objective of the invention is to provide a glass sheet having a high luminous transmittance and having edges which are warm-toned to neutral/colorless, the glass being producible without major issues of color stability.

Still another objective of the invention is to provide a glass sheet having a high luminous transmittance and having edges which are warm-toned to neutral/colorless, and which is substantially not subjected to solarization.

Another objective of the invention is to supply a solution to the disadvantages of the prior art that is simple and, above all, economical.

4. DETAILED DESCRIPTION OF THE INVENTION

The invention relates to a glass sheet having a luminous transmission LTD4≥87% and having a composition free of antimony and arsenic comprising the following:

total iron (expressed in the form of $Fe_2O_3$): 0.002-0.04 wt %
erbium (expressed in the form of $Er_2O_3$): 0.003-0.1 wt %
redox ratio ≤32%
$1.3*Fe_2O_3 \leq Er_2O_3 - 21.87*Cr_2O_3 - 53.12*Co \leq 2.6*Fe_2O_3$.

Hence, the invention lies on a novel and inventive approach since it enables to find a solution for the disadvantages of prior art. The inventors have indeed found that, surprisingly, combining in an antimony- and arsenic-free low-iron glass matrix:

(i) erbium in specific amounts (significantly higher amounts than for selenium in known glasses with wood-toned edges);

(ii) a relatively low redox ratio, and (ii) a link between the iron content and the contents in erbium (and in chromium and cobalt if present), as follows:
$1.3*Fe_2O_3 \leq Er_2O_3 - 21.87*Cr_2O_3 - 53.12*Co \leq 2.6*Fe_2O_3$ allows to reach a glass sheet with a high luminous transmittance and with edges which are warm-toned (positive a*b* coordinates) to neutral, the glass being producible without major issues of color stability and substantially not subjected to solarization.

In present description and claims, to quantify the luminous transmittance of the glass sheet, one considers the total light transmission with illuminant D65 (LTD) for a sheet thickness of 4 mm (LTD4) at a solid angle of observation of 2° (according to standard ISO9050). The light transmission represents the percentage of light flux emitted between wavelengths 380 nm and 780 nm which is transmitted through the glass sheet.

In present description and claims and otherwise specified, to evaluate the color of the glass sheet, one considers CIELab values: a* and b*, measured for a sheet thickness of 4 mm, in transmission with illuminant D65, 10°, SCI.

Other features and advantages of the invention will be made clearer from reading the following description of preferred embodiments, given by way of simple illustrative and non-restrictive examples.

Throughout the present text, when a range is indicated, the extremities are included, except if explicitly described in another way. In addition, all the integral and subdomain values in the numerical range are expressly included as if explicitly written. Also, throughout the present text, the values of content are in percentage, except if explicitly described in another way (i.e. in ppm). Moreover, throughout the present text also, values of content in percentages are by weight (also mentioned as wt %) expressed with respect to the total weight of the glass. Moreover, when a glass composition is given, this relates to the bulk composition of the glass.

According to the invention, the glass sheet has an antimony-free composition. This means that the element antimony is not intentionally added in the glass batch/raw materials and that, if it is present, $Sb_2O_3$ content in the composition of the glass sheet reaches only level of an impurity unavoidably included in the production. Preferably, the composition of the glass sheet comprises $Sb_2O_3$ in a content lower than 0.01 wt %. Preferably, the composition of the glass sheet comprises $Sb_2O_3$ in a content lower than 0.005 wt %. More preferably, the composition of the glass sheet comprises $Sb_2O_3$ in a content lower than 0.002 wt %. $Sb_2O_3$ is harmful to the environment and health, so its use is prohibited or at least strictly controlled and should therefore be avoided. In addition, if the glass sheet is floated, an unwanted reduction reaction occurs at the contact with the tin, giving a very unpleasant coloration, which is averse for the objective of the invention.

According to the invention, the glass sheet has an arsenic-free composition. This means that the element arsenic is not intentionally added in the glass batch/raw materials and that, if it is present, $As_2O_3$ content in the composition of the glass sheet reaches only level of an impurity unavoidably included in the production. Preferably, the composition of the glass sheet comprises $As_2O_3$ in a content lower than 0.01 wt %. Preferably, the composition of the glass sheet comprises $As_2O_3$ in a content lower than 0.005 wt %. More preferably, the composition of the glass sheet comprises $As_2O_3$ in a content lower than 0.002 wt %. $As_2O_3$ is harmful to the environment and health, so its use is prohibited or at least strictly controlled and should therefore be avoided. In addition, if the glass sheet is floated, an unwanted reduction reaction occurs at the contact with the tin, giving a very unpleasant coloration, which is averse for the objective of the invention.

Preferably, the glass sheet according to the invention has advantageously a LTD4≥88%, 89%, or even ≥90%, or better ≥90.5%, ≥90.75% or even more better ≥91%, ≥91.15, ≥91.2%, ≥91.3%.

The glass sheet according to the invention has a*≥0 and b*≥0, a* and b* being measured for a sheet thickness of 4 mm in transmission with illuminant D65, 10°, SCI.

The glass sheet according to the invention may have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The glass sheet according to the invention can have a thickness of from 0.1 to 30 mm. Advantageously, in the case of the touch panels application, the glass sheet according to the invention can have a thickness of from 0.1 to 6 mm. Preferably, in the case of the touchscreens application, for reasons of weight, the thickness of the glass sheet according to the invention is of from 0.1 to 2.2 mm. Alternatively, preferably, for any application other than the screen application, essentially for reasons of mechanical strength, the thickness of the glass sheet according to the invention is of from 4 to 12 mm.

Preferably, the glass of the invention is completely amorphous material, thereby excluding any crystalline material, even partially crystalline material (such as, for example, glass-crystalline or glass-ceramic materials).

The glass sheet according to the invention can be a glass sheet obtained by a floating process, a drawing process, a rolling process or any other process known to manufacture a glass sheet starting from a molten glass composition. According to a preferred embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

According to the invention, the composition of the invention comprises total iron (expressed in terms of $Fe_2O_3$) as follows: 0.002-0.04 wt %. In present description, when talking about total iron content in glass composition, "total iron" and "$Fe_2O_3$" are used as well. According to an embodiment, the composition comprises total iron ≥0.004 wt %. Preferably, the composition comprises total iron ≥0.005 wt %. More preferably, the composition comprises total iron ≥0.006 wt % or even, ≥0.007 wt %. These increasing minimum values make it possible not to excessively damage the cost of the glass as such low iron values often require expensive, very pure, starting materials and also their purification. Preferably, the composition comprises total iron ≥0.03 wt %. More preferably, the composition comprises total iron ≥0.02 wt % or even, ≤0.015 wt % or even better, ≥0.01 wt %. These decreasing maximum values in total iron allow to reach higher and higher values of luminous transmittance. To avoid any doubt herein, each embodiment concerning lower limits in $Fe_2O_3$ is of course combinable independently with any possible embodiment concerning higher limits in $Fe_2O_3$.

According to the invention, the composition of the invention comprises erbium (expressed in the form of $Er_2O_3$) as follows: 0.003-0.1 wt %. Preferably, the composition comprises $Er_2O_3$≥0.005 wt %. More preferably, the composition comprises $Er_2O_3$≥0.01 wt % or even, ≥0.015 wt % or even better, ≥0.02 wt %. These minimum values allow to better target the desired color. Preferably, the composition comprises $Er_2O_3$≤0.08 wt % or better, ≤0.06 wt % or even better, ≤0.05 wt %. These decreasing maximum values make possible (i) not to excessively damage the cost of the glass as erbium raw materials are very expensive, (ii) not to excessively damage the luminous transmission, and (iii) avoid a too excessive dichroism phenomenon. To avoid any doubt herein, each embodiment concerning lower limits in $Er_2O_3$ is of course combinable independently with any possible embodiment concerning higher limits in $Er_2O_3$.

According to the invention, the composition of the invention comprises: $1.3*Fe_2O_3 \leq Er_2O_3 - 21.87*Cr_2O_3 - 53.12*Co \leq 2.6*Fe_2O_3$. In the invention, it is understood that chromium and cobalt are components that are only optional. In this formula, all amounts must be expressed with the same unit (wt % or ppm).

Preferably, the composition comprises: $1.4*Fe_2O_3 \leq Er_2O_3 - 21.87*Cr_2O_3 - 53.12*Co$. More preferably, the composition comprises: $1.5*Fe_2O_3 \leq Er_2O_3 - 21.87*Cr_2O_3 - 53.12*Co$ or even, $1.7*Fe_2O_3 \leq Er_2O_3 - 21.87*Cr_2O_3 - 53.12*Co$, or even better, $1.8*Fe_2O_3 \leq Er_2O_3 - 21.87*Cr_2O_3 - 53.12*Co$. These minimum values allow to better target the desired color and high luminous transmittance. Preferably, the composition comprises: $Er_2O_3 - 21.87*Cr_2O_3 - 53.12*Co \leq 2.4*Fe_2O_3$. More preferably, the composition comprises: $Er_2O_3 - 21.87*Cr_2O_3 - 53.12*Co \leq 2.2*Fe_2O_3$ or even, $Er_2O_3 - 21.87*Cr_2O_3 - 53.12*Co \leq 2*Fe_2O_3$. These maximum values also allow to better target the desired color and high luminous transmittance. To avoid any doubt herein, each embodiment concerning lower limits is of course combinable independently with any possible embodiment concerning higher limits.

According to the invention, the composition of the invention has a redox ratio ≤32%. The redox ratio in present invention is in accordance with what is generally acknowledged in the art of glass composition and is defined as the ratio of the $Fe^{3+}$ content (as calculated as $Fe_2O_3$) to the total iron content (expressed as $Fe_2O_3$). According to an embodiment of the invention, the composition of the invention has a redox ratio ≤30%. Preferably, the composition of the invention has a redox ratio ≤28%, or even ≤26%, or even better ≤25%. Such low redox values allows to reach higher level of luminous transmission and make easier to reach the "first dial" (positive a*b*) by using $Er_2O_3$ according to the invention.

For reasons already mentioned above (to avoid the phenomenon of solarization) and according to a preferred embodiment, the composition of the glass sheet includes a cerium content (expressed as $CeO_2$)≤0.05 wt %. Preferably, the composition of the glass sheet comprises a cerium content (expressed as $CeO_2$)≤0.03 wt % or even ≤0.01 wt %. More preferably, the composition of the glass sheet is free of $CeO_2$. This means that the element cerium is not intentionally added in the glass batch/raw materials and that, if it is present, its content in the composition of the glass sheet reaches only level of an impurity unavoidably included in the production.

According to another embodiment, the composition of the glass sheet comprises ZnO in a content lower than 0.1 wt %. Preferably, the composition of the glass sheet comprises ZnO in a content lower than 0.01 wt %. More preferably, the composition of the glass sheet is free of ZnO. This means that the element zinc is not intentionally added in the glass batch/raw materials and that, if it is present, ZnO content in the composition of the glass sheet reaches only level of an impurity unavoidably included in the production.

According to still another embodiment, the composition of the glass sheet comprises SrO in a content lower than 0.1 wt %. Preferably, the composition of the glass sheet comprises SrO in a content lower than 0.01 wt %. More preferably, the composition of the glass sheet is free of SrO. This means that the element strontium is not intentionally added in the glass batch/raw materials and that, if it is present, SrO content in the composition of the glass sheet reaches only level of an impurity unavoidably included in the production.

According to still another embodiment, the composition of the glass sheet comprises $SnO_2$ in a content lower than 0.1 wt %. The $SnO_2$ content herein means the $SnO_2$ content in the bulk of the glass sheet, excluding the so-called "tin face" in the case of a float glass sheet. Preferably, the composition of the glass sheet comprises $SnO_2$ in a content lower than 0.03 wt %. More preferably, the composition of the glass sheet comprises $SnO_2$ in a content lower than 0.01 wt %. In the most preferred embodiment, the composition of the glass sheet is free of $SnO_2$. This means that the element tin is not intentionally added in the glass batch/raw materials and that, if it is present, $SnO_2$ content in the composition of the glass sheet reaches only level of an impurity unavoidably included in the production. If present, $SnO_2$ will tend to increase redox ratio, hence decreasing luminous transmittance and promoting cold tints in the glass.

The glass sheet according to the invention is made of glass which may belong to various categories. The glass can thus be a glass of soda-lime-silica, aluminosilicate or borosilicate type, and the like. Preferably, the composition of the glass sheet comprises the following in weight percentage, expressed with respect to the total weight of glass:

| | |
|---|---|
| $SiO_2$ | 40-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5%. |

More preferably, notably for low production costs reasons, the glass composition is a soda-lime-silicate-type glass. According to this embodiment, by "soda-lime-silicate-type glass", it is meant that the base glass matrix of the composition comprises the following in weight percentage, expressed with respect to the total weight of glass:

| | |
|---|---|
| $SiO_2$ | 60-78 wt % |
| $Al_2O_3$ | 0-8 wt % |
| $B_2O_3$ | 0-4 wt % |
| CaO | 0-15 wt % |
| MgO | 0-10 wt % |
| $Na_2O$ | 5-20 wt % |
| $K_2O$ | 0-10 wt % |
| BaO | 0-5 wt %. |

According to this embodiment, preferably, the base glass matrix of the composition comprises the following in weight percentage, expressed with respect to the total weight of glass:

| | |
|---|---|
| $SiO_2$ | 60-78 wt % |
| $Al_2O_3$ | 0-6 wt % |
| $B_2O_3$ | 0-1 wt % |
| CaO | 5-15 wt % |
| MgO | 0-8 wt % |
| $Na_2O$ | 10-20 wt % |
| $K_2O$ | 0-10 wt % |
| BaO | 0-1 wt %. |

In a preferred embodiment of the invention, the composition comprises the following in weight percentage, expressed with respect to the total weight of glass:

$65 \leq SiO_2 \leq 78$ wt %

$5 \leq Na_2O \leq 20$ wt %

$0 \leq K_2O < 5$ wt %

$1 \leq Al_2O_3 < 6$ wt %

$0 \leq CaO < 4.5$ wt %

$4 \leq MgO \leq 12$ wt %

$(MgO/(MgO+CaO)) \geq 0.5$.

In another preferred embodiment of the invention, the composition comprises the following in weight percentage, expressed with respect to the total weight of glass:

$65 \leq SiO_2 \leq 78\%$ $5 \leq Na_2O \leq 20\%$ $0 \leq K_2O < 5\%$ $3 < Al_2O_3 \leq 5\%$ $0 < CaO < 4.5\%$ $4 \leq MgO \leq 12\%$;

$0.88 \leq [MgO/(MgO+CaO)] < 1$.

In another preferred embodiment of the invention, the composition comprises the following in weight percentage, expressed with respect to the total weight of glass:

$60 \leq SiO_2 \leq 78\%$ $5 \leq Na_2O \leq 20\%$ $0.9 < K_2O \leq 12\%$ $4.9 \leq Al_2O_3 \leq 8\%$ $0.4 < CaO < 2\%$ $4 < MgO \leq 12\%$ In another preferred embodiment of the invention, the composition comprises the following in weight percentage, expressed with respect to the total weight of glass:

$65 \leq SiO_2 \leq 78$ wt %

$5 \leq Na_2O \leq 20$ wt %

$1 \leq K_2O < 8$ wt %

$1 \leq Al_2O_3 < 6$ wt %

$2 \leq CaO < 10$ wt %

0≤MgO≤8 wt %

$K_2O/(K_2O+Na_2O)$: 0.1-0.7.

In particular, examples of base glass matrixes for the composition according to the invention are described published PCT patent applications WO2015/150207A1 and WO2015/150403A1, in filed PCT patent applications PCT/EP2015/078305 and PCT/EP2016/058090, and in EP patent application no 16176447.7.

The above mentioned compositions with high MgO are especially well-suited as they allow to increase light transmission by decreasing the proportion of 6-folded $Fe^{2+}$ ions in the glass matrix, hence decreasing the strong absorption peak of $Fe^{2+}$ in the end of visible/near-IR range. In the same way, it has been shown (for example, in US20100304949A1) that glass compositions with higher $K_2O$ amount allows to increase luminous transmittance, which makes the above compositions containing $K_2O$ especially well-suited for the purpose of the invention.

Advantageously, the glass sheet of the invention may be tempered, mechanically or chemically. It may also be bended/curved, or in a general manner, deformed to reach any desired configuration (by cold-bending, thermo-forming, . . . ). It may also be laminated.

According to an embodiment of the invention, the glass sheet is coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

According to another advantageous embodiment of the invention, the glass sheet is coated with at least one antireflection layer. This embodiment is obviously advantageous in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

According to another embodiment, the glass sheet is coated with at least one anti-fingerprint layer or has been treated so as to reduce or prevent fingerprints from registering. This embodiment is also advantageous in the case of use of the glass sheet of the invention as front face of a touchscreen. Such a layer or such a treatment can be combined with a transparent and electrically conducting thin layer deposited on the opposite face. Such a layer can be combined with an antireflection layer deposited on the same face, the anti-fingerprint layer being on the outside of the stack and thus covering the antireflection layer.

According to still another embodiment, the glass sheet is coated with at least one layer or has been treated so as to reduce or prevent glaring and/or sparkling. This embodiment is of course advantageous in the case of use of the glass sheet of the invention as front face of a display device. Such an anti-glare or anti-sparkling treatment is for example an acid-etching producing a specific roughness of the treated face of the glass sheet.

According to still another embodiment, the glass sheet has been treated so as to gain antibacterial properties (i.e. through a known silver treatment). Such a treatment is also advantageous in the case of use of the glass sheet of the invention as front face of a display device.

According to still another embodiment, the glass sheet is coated with at least one paint layer including enamel, organic paint, lacquer, . . . . This paint layer may advantageously be colored or white. According to this embodiment, the glass sheet may be coated on at least one face in its entire surface or only partially.

According to the applications and/or properties desired, other layer(s)/treatment(s) can be deposited/done on one and/or the other face of the glass sheet according to the invention.

The glass sheets of the invention is of particular interest if integrated in/associated with/used as objects as diversified as: furniture (tables, shelves, chairs, doors, . . . ), electronic devices, appliances, white boards, credencies, shower doors, wall panels, façades, interior partitions, lighting, . . . .

Embodiments of the invention will now be further described, by way of examples only, together with some comparative examples, not in accordance with the invention. The following examples are provided for illustrative purposes, and are not intended to limit the scope of this invention.

EXAMPLES

Different glass sheets, according to the invention or comparative, were either (i) produced industrially ("ind") or (ii) prepared in the lab ("lab"), or (iii) calculated/simulated ("simu"), with variable amounts of total iron, erbium, chromium, cobalt and redox, and with different base glass matrixes.

For the lab preparation of glass sheets (EX9.x, EX10.x): Powder raw materials were mixed together, in amounts according to the targeted composition: a base glass matrix to which it has been added raw materials comprising erbium, iron and optionally cobalt and chromium (note that iron is already at least partly present in the raw materials of the base composition as an impurity). The raw material mixture was then heated up in an electrical furnace to a temperature allowing complete melting of the raw material.

For glass sheets produced industrially (EX11.x): they were produced in a classical manner on a mass production float furnace.

The optical properties of each glass sheet prepared in the lab or industrially were measured on a Perkin Elmer Lambda 950 spectrophotometer fitted with an integrating sphere of 150 mm in diameter, and in particular:

The luminous transmittance LTD4 was determined according to the ISO9050 standard to a thickness of 4 mm with a solid viewing angle of 2° (D65 illuminant) and for a wavelength range between 380 and 780 nm;

The CIE L* a*b* parameters were determined in transmission with the following parameters: Illuminant D65, 10°, 4 mm thickness.

For the simulation/computation of glass sheets (EX1.x, EX2.x, EX3.x, EX4.x, EX5.x, EX6.x and EX7.x): the optical properties were computed on the basis of optical properties of different glass colorants (using linear absorption coefficient, determined for the concerned base glass matrix, to build the complete optical spectra and compute the parameters of interest). The base glass matrix considered in computation is the following, corresponding to a glass matrix according to EP patent application no 16176447.7:

|  | Amount [wt %] |
|---|---|
| $SiO_2$ | 66.5 |
| CaO | 1.1 |
| $K_2O$ | 1.0 |

|  | Amount [wt %] |
| --- | --- |
| $Na_2O$ | 16.2 |
| $SO_3$ | 0.4 |
| $Al_2O_3$ | 5.6 |
| MgO | 9.4 |

Some classical soda-lime glass sheets from the state-of-the-art and commercially available were also evaluated in terms of optical properties, as comparative examples (EX8.1, EX8.2, EX8.3). EX8.3 corresponds to a classical low-iron solar glass sheet from the state-of-the-art (Sunmax® glass from AGC Glass Europe).

Results:

Compositions and optical properties for comparative examples ("comp") as well as examples according to the invention ("inv") are shows in Tables 1-11.

TABLE 1

|  | EX1.1 comp | EX1.2 comp | EX1.3 inv simu | EX1.4 inv | EX1.5 comp |
| --- | --- | --- | --- | --- | --- |
| $Fe_2O_3$ (ppm) | 100 | 100 | 100 | 100 | 100 |
| $Er_2O_3$ (ppm) | 0 | 75 | 130 | 250 | 500 |
| $Cr_2O_3$ (ppm) | 0 | 0 | 0 | 0 | 0 |
| Co (ppm) | 0 | 0 | 0 | 0 | 0 |
| Redox (%) | 20 | 20 | 20 | 20 | 20 |
| $Er_2O_3/Fe_2O_3$ | 0.00 | 0.75 | 1.30 | 2.50 | 5.00 |
| $[Er_2O_3 - 21.87 * Cr_2O_3 - 53.12 * Co]/Fe_2O_3$ | 0.00 | 0.75 | 1.30 | 2.50 | 5.00 |
| a* (4 mm, D65, 10°) | -0.06 | -0.02 | 0.02 | 0.10 | 0.26 |
| b* (4 mm, D65, 10°) | 0.13 | 0.11 | 0.10 | 0.06 | -0.01 |
| L* (4 mm, D65, 10°) | 96.70 | 96.68 | 96.67 | 96.65 | 96.60 |
| LTD4 (%, D65, 2°) | 91.71 | 91.67 | 91.65 | 91.59 | 91.47 |

TABLE 2

|  | EX2.1 comp | EX2.2 comp | EX2.3 inv simu | EX2.4 inv | EX2.5 comp |
| --- | --- | --- | --- | --- | --- |
| $Fe_2O_3$ (ppm) | 100 | 100 | 100 | 100 | 100 |
| $Er_2O_3$ (ppm) | 0 | 100 | 150 | 250 | 300 |
| $Cr_2O_3$ (ppm) | 0 | 0 | 0 | 0 | 0 |
| Co (ppm) | 0 | 0 | 0 | 0 | 0 |
| Redox (%) | 30 | 30 | 30 | 30 | 30 |
| $Er_2O_3/Fe_2O_3$ | 0.00 | 1.00 | 1.50 | 2.50 | 3.00 |
| $[Er_2O_3 - 21.87 * Cr_2O_3 - 53.12 * Co]/Fe_2O_3$ | 0.00 | 1.00 | 1.50 | 2.50 | 3.00 |
| a* (4 mm, D65, 10°) | -0.09 | -0.03 | 0.01 | 0.07 | 0.10 |
| b* (4 mm, D65, 10°) | 0.08 | 0.05 | 0.03 | 0.00 | -0.01 |
| L* (4 mm, D65, 10°) | 96.68 | 96.66 | 96.65 | 96.63 | 96.62 |
| LTD4 (%, D65, 2°) | 91.65 | 91.60 | 91.58 | 91.53 | 91.51 |

TABLE 3

|  | EX3.1 comp | EX3.2 comp | EX3.3 inv simu | EX3.4 comp |
| --- | --- | --- | --- | --- |
| $Fe_2O_3$ (ppm) | 400 | 400 | 400 | 400 |
| $Er_2O_3$ (ppm) | 0 | 400 | 800 | 1200 |
| $Cr_2O_3$ (ppm) | 0 | 0 | 0 | 0 |
| Co (ppm) | 0 | 0 | 0 | 0 |
| Redox (%) | 22 | 22 | 22 | 22 |
| $Er_2O_3/Fe_2O_3$ | 0.00 | 1.00 | 2.00 | 3.00 |
| $[Er_2O_3 - 21.87 * Cr_2O_3 - 53.12 * Co]/Fe_2O_3$ | 0.00 | 1.00 | 2.00 | 3.00 |
| a* (4 mm, D65, 10°) | -0.38 | -0.12 | 0.14 | 0.39 |
| b* (4 mm, D65, 10°) | 0.26 | 0.14 | 0.03 | -0.08 |
| L* (4 mm, D65, 10°) | 96.46 | 96.39 | 96.31 | 96.23 |
| LTD4 (%, D65, 2°) | 91.14 | 90.95 | 90.76 | 90.57 |

TABLE 4

|  | EX4.1 comp | EX4.2 comp | EX4.3 inv simu | EX4.4 comp |
| --- | --- | --- | --- | --- |
| $Fe_2O_3$ (ppm) | 200 | 200 | 200 | 200 |
| $Er_2O_3$ (ppm) | 0 | 200 | 350 | 600 |
| $Cr_2O_3$ (ppm) | 0 | 0 | 0 | 0 |
| Co (ppm) | 0 | 0 | 0 | 0 |
| Redox (%) | 27 | 27 | 27 | 27 |
| $Er_2O_3/Fe_2O_3$ | 0.00 | 1.00 | 1.75 | 3.00 |
| $[Er_2O_3 - 21.87 * Cr_2O_3 - 53.12 * Co]/Fe_2O_3$ | 0.00 | 1.00 | 1.75 | 3.00 |
| a* (4 mm, D65, 10°) | -0.20 | -0.07 | 0.03 | 0.19 |
| b* (4 mm, D65, 10°) | 0.11 | 0.05 | 0.01 | -0.06 |
| L* (4 mm, D65, 10°) | 96.60 | 96.56 | 96.53 | 96.48 |
| LTD4 (%, D65, 2°) | 91.45 | 91.36 | 91.28 | 91.16 |

TABLE 5

|  | EX5.1 comp | EX5.2 comp | EX5.3 inv simu | EX5.4 comp |
| --- | --- | --- | --- | --- |
| $Fe_2O_3$ (ppm) | 80 | 80 | 80 | 80 |
| $Er_2O_3$ (ppm) | 0 | 40 | 200 | 400 |
| $Cr_2O_3$ (ppm) | 0 | 0 | 0 | 0 |
| Co (ppm) | 0 | 0 | 0 | 0 |
| Redox (%) | 25 | 25 | 25 | 25 |
| $Er_2O_3/Fe_2O_3$ | 0.00 | 0.50 | 2.50 | 5.00 |
| $[Er_2O_3 - 21.87 * Cr_2O_3 - 53.12 * Co]/Fe_2O_3$ | 0.00 | 0.50 | 2.50 | 5.00 |
| a* (4 mm, D65, 10°) | -0.06 | -0.03 | 0.07 | 0.20 |
| b* (4 mm, D65, 10°) | 0.10 | 0.09 | 0.04 | -0.02 |
| L* (4 mm, D65, 10°) | 96.70 | 96.70 | 96.66 | 96.63 |
| LTD4 (%, D65, 2°) | 91.72 | 91.70 | 91.63 | 91.53 |

TABLE 6

| | EX6.1 comp | EX6.2 comp | EX6.3 inv | EX6.4 comp | EX6.5 comp simu | EX6.6 inv | EX6.7 comp | EX6.8 comp | EX6.9 inv |
|---|---|---|---|---|---|---|---|---|---|
| $Fe_2O_3$ (ppm) | 150 | 150 | 150 | 150 | 150 | 150 | 150 | 150 | 150 |
| $Er_2O_3$ (ppm) | 0 | 150 | 200 | 600 | 200 | 637.5 | 200 | 418.7 | 466.6 |
| $Cr_2O_3$ (ppm) | 0 | 0 | 0 | 0 | 20 | 20 | 10 | 10 | 10 |
| Co (ppm) | 0 | 0 | 0 | 0 | 0 | 0 | 0.9 | 0.9 | 0.9 |
| Redox (%) | 20 | 20 | 20 | 20 | 20 | 20 | 20 | 20 | 20 |
| $Er_2O_3/Fe_2O_3$ | 0.00 | 1.00 | 1.33 | 4.00 | 1.33 | 4.25 | 1.33 | 2.79 | 3.11 |
| $[Er_2O_3-21.87*Cr_2O_3-53.12*Co]/Fe_2O_3$ | 0.00 | 1.00 | 1.33 | 4.00 | -1.59 | 1.33 | -0.45 | 1.01 | 1.33 |
| a* (4 mm, D65, 10°) | -0.11 | -0.02 | 0.02 | 0.27 | -0.26 | 0.02 | -0.15 | -0.01 | 0.02 |
| b* (4 mm, D65, 10°) | 0.16 | 0.12 | 0.11 | -0.01 | 0.41 | 0.29 | 0.08 | 0.02 | 0.00 |
| L* (4 mm, D65, 10°) | 96.66 | 96.63 | 96.62 | 96.55 | 96.44 | 96.35 | 96.40 | 96.36 | 96.35 |
| LTD4 (%, D65, 2°) | 91.62 | 91.55 | 91.53 | 91.33 | 91.10 | 90.89 | 90.98 | 90.88 | 90.85 |

TABLE 7

| | EX7.1 inv | EX7.2 inv | EX7.3 inv simu | EX7.4 comp | EX7.5 comp |
|---|---|---|---|---|---|
| $Fe_2O_3$ (ppm) | 100 | 100 | 100 | 100 | 100 |
| $Er_2O_3$ (ppm) | 200 | 200 | 200 | 200 | 200 |
| $Cr_2O_3$ (ppm) | 0 | 0 | 0 | 0 | 0 |
| Co (ppm) | 0 | 0 | 0 | 0 | 0 |
| Redox (%) | 10 | 20 | 30 | 40 | 50 |
| $Er_2O_3/Fe_2O_3$ | 2.00 | 2.00 | 2.00 | 2.00 | 2.00 |
| $[Er_2O_3-21.87*Cr_2O_3-53.12*Co]/Fe_2O_3$ | 2.00 | 2.00 | 2.00 | 2.00 | 2.00 |
| a* (4 mm, D65, 10°) | 0.11 | 0.07 | 0.04 | 0.00 | -0.03 |
| b* (4 mm, D65, 10°) | 0.15 | 0.08 | 0.00 | -0.07 | -0.14 |
| L* (4 mm, D65, 10°) | 96.66 | 96.63 | 96.60 | 96.58 | 96.55 |
| LTD4 (%, D65, 2°) | 91.62 | 91.55 | 91.47 | 91.40 | 91.32 |

TABLE 8

| | EX8.1 comp | EX8.2 comp | EX8.3 comp Glass sheets commercially available |
|---|---|---|---|
| $SiO_2$ (wt %) | 71.9 | 72.2 | 72.0 |
| CaO (wt %) | 9.2 | 9.1 | 7.9 |
| $K_2O$ (wt %) | 0.4 | 0.0 | 0.0 |
| $Na_2O$ (wt %) | 13.5 | 13.8 | 13.9 |
| $SO_3$ (wt %) | 0.2 | 0.2 | 0.4 |
| $Al_2O_3$ (wt %) | 0.4 | 0.7 | 1.3 |
| MgO (wt %) | 4.3 | 4.0 | 4.5 |
| $Fe_2O_3$ (ppm) | 100 | 94 | 119 |
| $Er_2O_3$ (ppm) | 100 | 100 | 0 |
| $Cr_2O_3$ (ppm) | 0 | 0 | 0 |
| Co (ppm) | 0 | 0 | 0 |
| Redox (%) | 42.0 | 32.1 | 22.8 |
| $Er_2O_3/Fe_2O_3$ | 1.00 | 1.06 | 0 |
| $[Er_2O_3-21.87*Cr_2O_3-53.12*Co]/Fe_2O_3$ | 1.00 | 1.06 | 0 |
| a* (4 mm, D65, 10°) | -0.14 | -0.09 | -0.14 |
| b* (4 mm, D65, 10°) | 0.02 | 0.07 | 0.15 |
| L* (4 mm, D65, 10°) | 96.50 | 96.54 | 96.64 |
| LTD4 (%, D65, 2°) | 91.22 | 91.32 | 91.56 |

TABLE 9

| | EX9.1 comp | EX9.2 comp lab | EX9.3 inv | EX9.4 comp |
|---|---|---|---|---|
| $SiO_2$ (wt %) | 71.8 | 71.8 | 71.8 | 71.8 |
| CaO (wt %) | 9.0 | 9.0 | 9.0 | 9.0 |
| $K_2O$ (wt %) | 0.1 | 0.1 | 0.1 | 0.1 |
| $Na_2O$ (wt %) | 13.8 | 13.8 | 13.8 | 13.8 |
| $SO_3$ (wt %) | 0.2 | 0.2 | 0.2 | 0.2 |
| $Al_2O_3$ (wt %) | 0.8 | 0.8 | 0.8 | 0.8 |
| MgO (wt %) | 4.3 | 4.3 | 4.3 | 4.3 |
| $Fe_2O_3$ (ppm) | 118 | 119 | 119 | 116 |
| $Er_2O_3$ (ppm) | 0 | 90 | 240 | 1380 |
| $Cr_2O_3$ (ppm) | 0 | 0 | 0 | 0 |
| Co (ppm) | 0 | 0 | 0 | 0 |
| Redox (%) | 19.3 | 15.6 | 18.2 | 21.5 |
| $Er_2O_3/Fe_2O_3$ | 0.00 | 0.76 | 2.02 | 11.90 |
| $[Er_2O_3-21.87*Cr_2O_3-53.12*Co]/Fe_2O_3$ | 0.00 | 0.76 | 2.02 | 11.90 |
| a* (4 mm, D65, 10°) | -0.11 | -0.05 | 0.00 | 0.45 |
| b* (4 mm, D65, 10°) | 0.13 | 0.17 | 0.11 | -0.09 |
| L* (4 mm, D65, 10°) | 96.45 | 96.44 | 96.43 | 96.28 |
| LTD4 (%, D65, 2°) | 91.10 | 91.10 | 91.10 | 90.70 |

TABLE 10

| | EX10.1 comp | EX10.2 inv lab | EX10.3 comp | EX10.4 comp | EX10.5 inv | EX10.6 comp |
|---|---|---|---|---|---|---|
| $SiO_2$ (wt %) | 66.5 | 66.6 | 66.6 | 67.2 | 67.2 | 67.3 |
| CaO (wt %) | 1.1 | 1.1 | 1.1 | 1.1 | 1.1 | 1.1 |
| $K_2O$ (wt %) | 1.0 | 1.0 | 1.0 | 1.0 | 1.0 | 0.9 |
| $Na_2O$ (wt %) | 16.2 | 16.2 | 16.2 | 16.2 | 16.2 | 16.2 |
| $SO_3$ (wt %) | 0.4 | 0.3 | 0.2 | 0.3 | 0.3 | 0.2 |
| $Al_2O_3$ (wt %) | 5.6 | 5.6 | 5.5 | 4.7 | 4.7 | 4.7 |
| MgO (wt %) | 9.4 | 9.4 | 9.4 | 9.6 | 9.6 | 9.6 |
| $Fe_2O_3$ (ppm) | 90 | 90 | 90 | 92 | 92 | 92 |
| $Er_2O_3$ (ppm) | 100 | 229 | 1009 | 97 | 231 | 1006 |

TABLE 10-continued

|  | EX10.1 comp | EX10.2 inv | EX10.3 comp lab | EX10.4 comp | EX10.5 inv | EX10.6 comp |
|---|---|---|---|---|---|---|
| $Cr_2O_3$ (ppm) | 0 | 0 | 0 | 0 | 0 | 0 |
| Co (ppm) | 0 | 0 | 0 | 0 | 0 | 0 |
| Redox (%) | 16.2 | 15.4 | 20.8 | 18.1 | 18.3 | 19.1 |
| $Er_2O_3/Fe_2O_3$ | 1.11 | 2.54 | 11.21 | 1.05 | 2.51 | 10.93 |
| $[Er_2O_3-21.87*Cr_2O_3-53.12*Co]/Fe_2O_3$ | 1.11 | 2.54 | 11.21 | 1.05 | 2.51 | 10.93 |
| a* (4 mm, D65, 10°) | −0.08 | 0.02 | 0.53 | −0.09 | 0.00 | 0.51 |
| b* (4 mm, D65, 10°) | 0.22 | 0.17 | −0.11 | 0.19 | 0.15 | −0.07 |
| L* (4 mm, D65, 10°) | 96.60 | 96.60 | 96.50 | 96.68 | 96.66 | 96.49 |
| LTD4 (%, D65, 2°) | 91.47 | 91.49 | 91.22 | 91.67 | 91.61 | 91.19 |

TABLE 11

|  | EX11.1 comp | EX11.2 inv ind | EX11.3 inv | EX11.4 comp |
|---|---|---|---|---|
| $SiO_2$ (wt %) | 66.7 | 66.6 | 66.5 | 69.4 |
| CaO (wt %) | 1.3 | 1.0 | 1.0 | 5.0 |
| $K_2O$ (wt %) | 1.0 | 1.0 | 1.1 | 0.6 |
| $Na_2O$ (wt %) | 15.7 | 15.8 | 15.8 | 14.7 |
| $SO_3$ (wt %) | 0.2 | 0.3 | 0.3 | 0.3 |
| $Al_2O_3$ (wt %) | 5.6 | 5.7 | 5.8 | 3.3 |
| MgO (wt %) | 9.5 | 9.5 | 9.5 | 6.7 |
| $Fe_2O_3$ (ppm) | 198 | 136 | 116 | 257 |
| $Er_2O_3$ (ppm) | 226 | 384 | 481 | 229 |
| $Cr_2O_3$ (ppm) | 0 | 1.7 | 6.5 | 3.8 |
| Co (ppm) | 0.29 | 0.35 | 0.75 | 0.38 |
| Redox (%) | 17.6 | 10.6 | 10.4 | 18.7 |
| $Er_2O_3/Fe_2O_3$ | 1.14 | 2.83 | 4.15 | 0.89 |
| $[Er_2O_3-21.87*Cr_2O_3-53.12*Co]/Fe_2O_3$ | 1.06 | 2.42 | 2.58 | 0.49 |
| a* (4 mm, D65, 10°) | −0.14 | 0.01 | 0.04 | −0.20 |
| b* (4 mm, D65, 10°) | 0.19 | 0.23 | 0.12 | 0.24 |
| L* (4 mm, D65, 10°) | 96.61 | 96.72 | 96.62 | 96.35 |
| LTD4 (%, D65, 2°) | 91.48 | 91.76 | 91.53 | 90.86 |

Those results proofs in a very clear manner that combining, in a low-iron glass matrix, a specific erbium content according to the invention together with a relatively low redox (≤32%) and a ratio $[Er_2O_3-21.87*Cr_2O_3-53.12*Co]/Fe_2O_3$ between 1.3 and 2.6 allows to reach the objective of the invention, namely a glass sheet with a high luminous transmittance and which lies in the first dial of the a*b* diagram (positive a*b* coordinates).

The invention claimed is:

1. A glass sheet having a composition comprising in weight percentage with respect to a total weight of the glass:

| $SiO_2$ | 40-78%; |
|---|---|
| $Al_2O_3$ | 0-18%; |
| $B_2O_3$ | 0-18%; |
| $Na_2O$ | 0-20%; |
| CaO | 0-15%; |
| MgO | 0-12%; |
| $K_2O$ | 0-12%; |
| BaO | 0-5%; | total iron (expressed in the form of $Fe_2O_3$) 0.002-0.04 wt %; and
erbium (expressed in the form of $Er_2O_3$) 0.003-0.1 wt %, wherein the glass sheet composition has a redox ratio ≤32%,
wherein $1.3*Fe_2O_3 \leq Er_2O_3-21.87*Cr_2O_3-53.12*Co \leq 2.6*Fe_2O_3$,
wherein the glass sheet composition is free of antimony and arsenic,
wherein the glass sheet has a luminous transmission LTD4 ≥87%, and
wherein the glass sheet has a* ≥0 and b* ≥0, a* and b* being measured for a sheet thickness of 4 mm in transmission with illuminant D65, 10°, SCI.

2. The glass sheet according to claim 1, wherein the composition comprises total iron from 0.002-0.03 wt %.

3. The glass sheet according to claim 1, wherein the composition comprises total iron from 0.002-0.02 wt %.

4. The glass sheet according to claim 1, wherein the composition has a redox ratio ≤30%.

5. The glass sheet according to claim 1, wherein the composition comprises $Er_2O_3 \leq 0.08$ wt %.

6. The glass sheet according to claim 1, wherein the composition comprises $Er_2O_3 \geq 0.01$ wt %.

7. The glass sheet according to claim 1, wherein the composition comprises $Er_2O_3 \geq 0.015$ wt %.

8. The glass sheet according to claim 1, wherein the composition comprises a cerium content (expressed as $CeO_2$) ≤0.05 wt %.

9. The glass sheet according to claim 1, wherein the glass sheet has a luminous transmission LTD4 ≥89%.

10. The glass sheet according to claim 1, wherein the composition comprises $1.5*Fe_2O_3 \leq Er_2O_3-21.87*Cr_2O_3-53.12*Co$.

11. The glass sheet according to claim 1, wherein the composition comprises $1.8*Fe_2O_3 \leq Er_2O_3-21.87*Cr_2O_3-53.12*Co$.

12. The glass sheet according to claim 1, wherein the composition comprises $Er_2O_3-21.87*Cr_2O_3-53.12*Co \leq 2.4*Fe_2O_3$.

13. The glass sheet according to claim 1, wherein the composition comprises $Er_2O_3-21.87*Cr_2O_3-53.12*Co \leq 2*Fe_2O_3$.

14. A glass sheet having a composition comprising, in weight percentage with respect to a total weight of the glass:

| $SiO_2$ | 60-78%; |
|---|---|
| $Al_2O_3$ | 0-8%; |
| $B_2O_3$ | 0-4%; |
| $Na_2O$ | 5-20%; |
| CaO | 0-15%; |
| MgO | 0-12%; |
| $K_2O$ | 0-12%; |
| BaO | 0-5%; | total iron (expressed in the form of $Fe_2O_3$) 0.002-0.04 wt %; and
erbium (expressed in the form of $Er_2O_3$) 0.003-0.1 wt %, wherein the glass sheet composition has a redox ratio ≤32%, wherein $1.3*Fe_2O_3 < Er_2O_3 - 21.87*Cr_2O_3 - 53.12*Co \leq 2.6*Fe_2O_3$, wherein the glass sheet composition is free of antimony and arsenic, wherein the glass sheet has a luminous transmission LTD4 ≥87%, and wherein the glass sheet has a* ≥0 and b* ≥0, a* and b* being measured for a sheet thickness of 4 mm in transmission with illuminant D65, 10°, SCI.

15. The glass sheet according to claim 14, wherein the composition comprises total iron from 0.002-0.03 wt %.

16. The glass sheet according to claim 14, wherein the composition comprises total iron from 0.002-0.02 wt %.

17. The glass sheet according to claim 14, wherein the composition has a redox ratio ≤30%.

18. The glass sheet according to claim 14, wherein the composition comprises $Er_2O_3 \leq 0.08$ wt %.

19. The glass sheet according to claim 14, wherein the composition comprises $Er_2O_3 \geq 0.01$ wt %.

20. The glass sheet according to claim 14, wherein the composition comprises $1.8*Fe_2O_3 \leq Er_2O_3 - 21.87*Cr_2O_3 - 53.12*Co$.

* * * * *